(12) United States Patent
Adachi et al.

(10) Patent No.: US 10,998,740 B2
(45) Date of Patent: *May 4, 2021

(54) BATTERY CONTROL SYSTEM

(71) Applicant: DENSO CORPORATION, Kariya (JP)

(72) Inventors: Norikazu Adachi, Kariya (JP); Tomoki Yamane, Kariya (JP); Takao Suenaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 304 days.

This patent is subject to a terminal disclaimer.

(21) Appl. No.: 15/849,903

(22) Filed: Dec. 21, 2017

(65) Prior Publication Data

US 2018/0183249 A1 Jun. 28, 2018

(30) Foreign Application Priority Data

Dec. 26, 2016 (JP) .............................. JP2016-251842

(51) Int. Cl.
*H01M 10/46* (2006.01)
*H02J 7/00* (2006.01)
*H01M 10/48* (2006.01)
*H01M 10/44* (2006.01)

(52) U.S. Cl.
CPC ......... *H02J 7/0029* (2013.01); *H01M 10/443* (2013.01); *H01M 10/46* (2013.01); *H01M 10/48* (2013.01); *H01M 10/486* (2013.01); *H02J 7/007* (2013.01); *H02J 7/0047* (2013.01); *H02J 7/0077* (2013.01); *H02J 7/00719* (2020.01); *H01M 2220/20* (2013.01); *H02J 7/0048* (2020.01); *H02J 2007/0067* (2013.01)

(58) Field of Classification Search
CPC .. G01R 31/389; G01R 31/387; G01R 31/388; G01R 31/374; H01M 2/348; H01M 2200/10; H01M 10/486; H01M 10/443; H01M 10/46; H01M 10/48; H01M 2220/20; H02J 7/0029; H02J 7/00719; H02J 7/0047; H02J 7/007; H02J 7/0048
USPC ................................. 320/103, 134–136, 150
See application file for complete search history.

(56) References Cited

U.S. PATENT DOCUMENTS

| 6,437,542 | B1 * | 8/2002 | Liaw ................... | H02J 7/00719 320/147 |
| 2008/0204031 | A1 * | 8/2008 | Iwane .................. | G01R 31/389 324/430 |
| 2010/0079111 | A1 * | 4/2010 | Masuda .............. | H01M 10/486 320/134 |

(Continued)

FOREIGN PATENT DOCUMENTS

| JP | H11-329512 A | 11/1999 |
| JP | 2016-093066 A | 5/2016 |
| JP | 2016-139484 A | 8/2016 |

*Primary Examiner* — Nghia M Doan
(74) *Attorney, Agent, or Firm* — Oliff PLC

(57) ABSTRACT

A battery control system includes a secondary battery producing gas inside thereof when being used; and a control unit that controls charging/discharging of the secondary battery. The control unit includes a capacity measuring unit that measures capacity of the secondary battery being deteriorated with the use of the same; and a stop commanding unit that stops charging/discharging of the secondary battery, when the capacity measured by the capacity measuring unit is less than or equal to a predetermined threshold.

4 Claims, 13 Drawing Sheets

(56) References Cited

U.S. PATENT DOCUMENTS

| | | | |
|---|---|---|---|
| 2011/0001352 A1* | 1/2011 | Tamura | B60L 58/15 |
| | | | 307/9.1 |
| 2012/0212184 A1* | 8/2012 | Klein | H02J 7/00718 |
| | | | 320/134 |
| 2019/0170830 A1* | 6/2019 | Ohkanda | G01R 31/389 |

* cited by examiner

BATTERY CONTROL SYSTEM

CROSS-REFERENCE TO RELATED APPLICATION

This application is based on and claims the benefit of priority from earlier Japanese Patent Application No. 2016-251842 filed Dec. 26, 2016, the description of which is incorporated herein by reference.

BACKGROUND

Technical Field

The present disclosure relates to a secondary battery and a battery control system provided with a control unit that controls charging/discharging of the secondary battery.

Description of the Related Art

A battery control system is known in which a secondary battery and a control unit that controls charging/discharging of battery are provided. For example, Japanese Patent application laid-open publication number 2016-93066 discloses an example of such a battery control system. Some types of secondary batteries such as lithium-ion batteries or sodium-ion batteries generate gas inside thereof, when the battery is repeatedly charged or discharged. In such a battery, a valve is provided in order to discharge gas generated inside the battery. In the case where the battery is repeatedly charged and discharged to generate gas inside thereof so that battery pressure increases inside the casing, the valve is opened to discharge the gas. Thus, failure such as expansion of the casing due to pressure of the gas is prevented.

However, opening the valve is likely to cause problems such as bad-smelling and leaking of the liquid inside the battery. Hence, according to the above-mentioned battery control system, charging/discharging is stopped before opening the valve. Taking the above-mentioned circumstance into consideration, the following method is adopted, for example.

Firstly, the battery temperature and state of charge (SOC) or the like are measured over a long period of time and continue to record the data. In the case where ambient temperature is high or the SOC is kept high continuously, batteries easy to generate gas so that internal pressure is likely to increase. Thus, the history of the battery temperature and the SOC and the internal pressure are correlated. Hence, current internal pressure of the battery can be estimated by using history information including past battery data such as the temperature and the SOC. When the estimated internal pressure reaches a predetermined value, control device determines to stop charging/discharging the battery.

However, according to the above-described battery control system, the reliability is low for the determination to stop charging/discharging the battery. This is because, when using history data of the temperature and the SOC, the temperature or the like have to be measured continuously for a long period of time. Hence, if the history information is lost due to some reason, the internal pressure of the battery cannot be estimated so that the determination to stop charging/discharging cannot be performed. Further, even in the case where the temperature can be continuously measured for a long period of time, an amount of measurement data becomes extremely large. Hence, it is difficult to estimate the internal pressure correctly based on this measurement data.

Therefore, according to the above-described battery control system, accuracy of the estimated internal pressure value is low, causing low reliability of determination to stop charging/discharging. For example, even in the case where the actual internal pressure is high, the system erroneously estimates that the internal pressure is low. Hence, charge/discharge operation for the battery is not stopped. Thus, the valve may be opened to cause bad-smelling to the environment. Furthermore, the system may erroneously estimate that the internal pressure is high, even though the internal pressure is actually low so that the charging/discharging operation is stopped.

SUMMARY

The present disclosure is achieved in light of the above-described circumstances and to provide a battery control system capable of improving reliability of the determination to stop the charging/discharging the battery.

According to an aspect of the present disclosure is a battery control system including a secondary battery producing gas inside thereof when being used; and a control unit that controls charging/discharging of the secondary battery. The control unit includes a capacity measuring unit that measures capacity of the secondary battery being deteriorated with the use of the same; and a stop commanding unit that stops charging/discharging of the secondary battery, when the capacity measured by the capacity measuring unit is less than or equal to a predetermined threshold.

The inventors of the present disclosure discovered that there is a correlation between the battery capacity which is deteriorated through cyclic discharging and charging and the internal pressure of the battery, in which the correlation is determined such that the lower the battery capacity with the use of the battery, the more increases an amount of gas, thereby increasing the internal pressure of the battery (see FIG. 1).

According to the present disclosure, this characteristic of the battery is utilized. Specifically, the battery capacity is measured and the charging/discharging is stopped when the measurement value is less than or equal to a predetermined threshold. According to this method, since the battery capacity has strong correlation with the internal pressure, accurate determination can be made to stop charging/discharging the battery. That is, when the battery capacity is less than or equal to the threshold, the internal pressure has probably reached a predetermined level. Hence, the charging/discharging operation can be accurately determined to stop.

Further, according to the configuration of the present disclosure, the latest battery capacity is measured and the stop determination of the charging/discharging operation by only using the latest battery capacity. Therefore, unlike conventional art where temperature is required to be measured for a long period of time, stop determination of charging/discharging can be made with only a simple control unit.

According to the present disclosure, since the stop determination of charging/discharging can be made with the latest battery capacity, unlike conventional art, measurement data such as temperature is not required to be accumulated. Therefore, fault due to lost measurement data causing malfunction of the stop determination can be avoided.

As described, according to the above-described aspects, a battery control system can be provided in which reliability is enhanced for the stop determination of charging/discharging battery. It should be noted that the bracket reference of individual means in this column and in the claims indicate correspondence to specific means in the embodiments which will be described later.

DETAILED DESCRIPTION OF THE PREFERRED EMBODIMENTS

The above-described battery control system can be an on-board battery control system used for an electric vehicle or a hybrid vehicle.

First Embodiment

Figure 1:
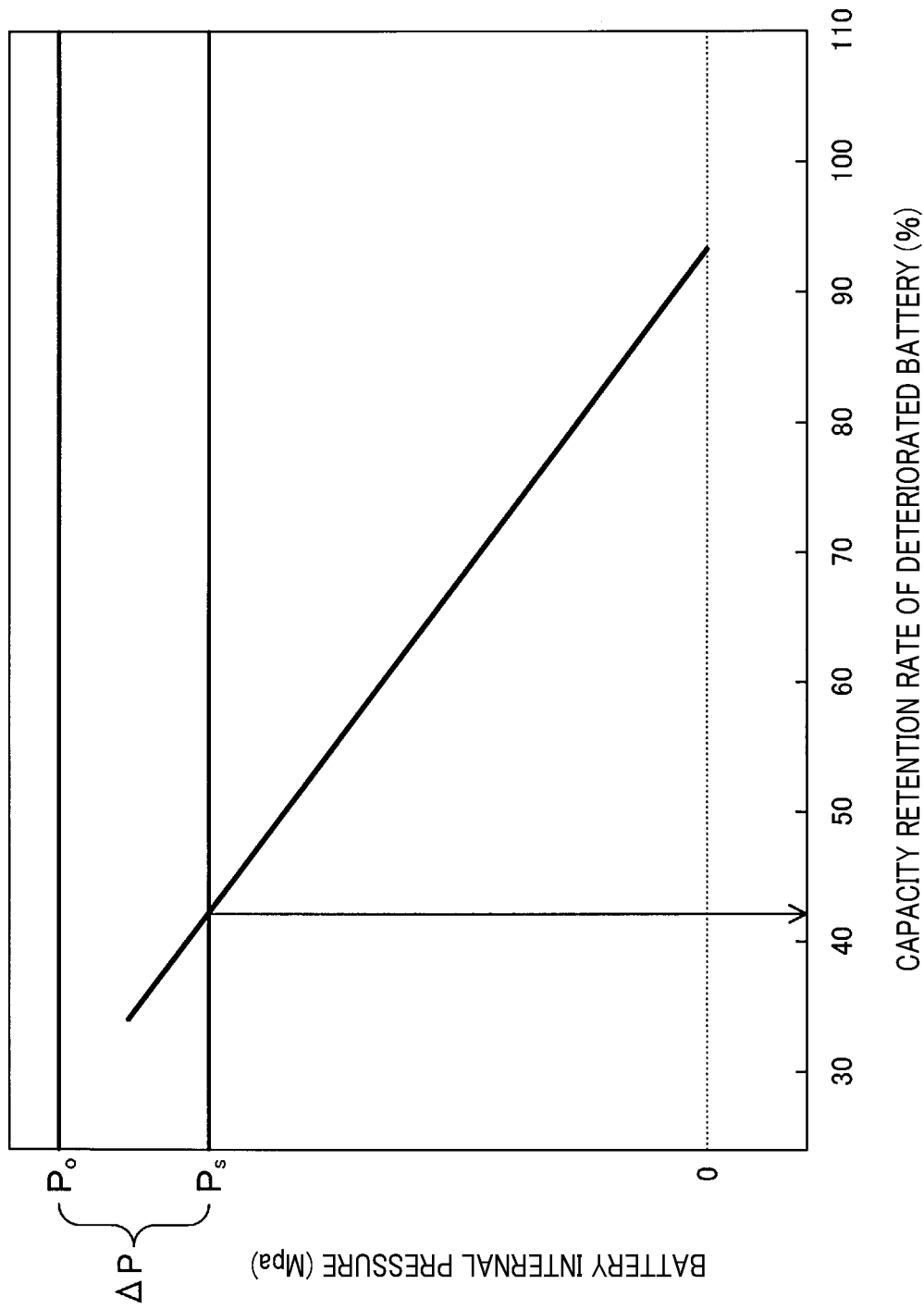
FIG. 1 is a graph showing a relationship between the battery capacity and the internal pressure according to a first embodiment of the present disclosure.
Figure 2:
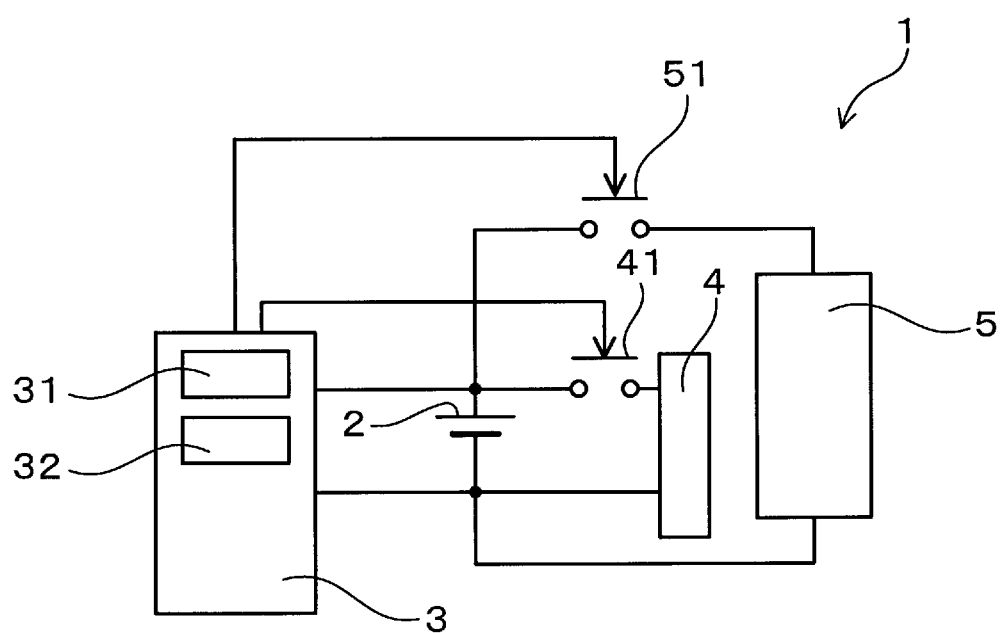
FIG. 2 is a diagram showing a concept of a battery control system.

With reference to FIGS. 1 to 5, an embodiment of the above-mentioned battery control system will be described. As shown in FIG. 2, the battery control system 1 according to the present embodiment is provided with a secondary battery 2, and a control unit 3. The secondary battery 2 is a battery such as a lithium ion battery or a sodium ion battery, producing gas inside thereof when being used. The control unit 3 controls charging/discharging of the secondary battery 2.

The control unit 3 is provided with a capacity measuring unit 31 and a stop commanding unit 32. The capacity measuring unit 31 measures a capacity of the secondary battery 2 being deteriorated with use of the secondary battery 2. The stop commanding unit 32 is configured to stop the charging/discharging the secondary battery 2, when the measured capacity reaches a predetermined threshold or less.

As shown in FIG. 2, a charging device 4 and a load 5 are connected to a battery 2. A charging switch 41 is disposed between the battery 2 and the charging device 4. Also, a load switch 51 is disposed between the load 5 and the battery 2. These charging switch 41 and the load switch 51 are ON-OFF controlled by the control unit 3. The control unit 3 turns the charging switch 41 ON when charging the battery 2, and turns the load switch 51 ON when driving the load 5.

The battery control system 1 according to the present embodiment is used as an on-vehicle battery control system mounted on an electric vehicle or a hybrid vehicle. The load 5 is an inverter for the vehicle. The inverter is connected to a three-phase AC (alternating current) motor that drives a vehicle. In other words, according to the present embodiment, by using the above-mentioned inverter, DC (direct current) power of the battery 2 is converted into AC power to be supplied to the above-mentioned three-phase AC motor. Thus, the vehicle is able to run.

Figure 5:
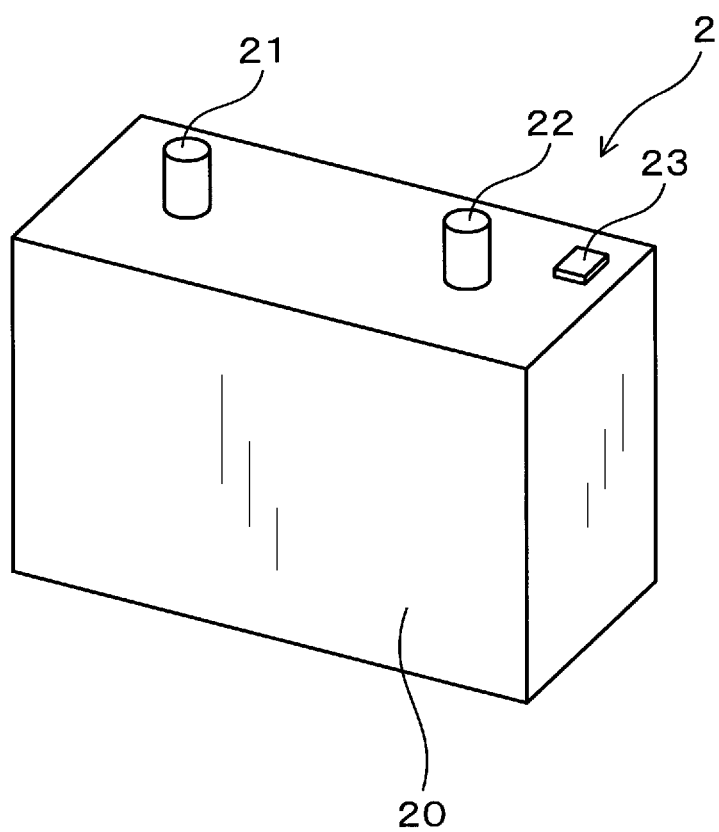
FIG. 5 is a perspective view showing a battery according to the first embodiment.

As shown in FIG. 5, the battery 2 is provided with a case 20, a pair of electrodes 21 and 22, a valve 23 provided on the case 20. When the battery 2 is repeatedly charged or discharged, electrolyte is dissolved to generate gas. Hence, the internal pressure increases. When the internal pressure reaches the opening pressure of the valve Po, the valve 23 is opened and the gas is discharged. At this time, bad smelling or electrolyte leakage is likely to occur. In this regard, according to the present embodiment, charging/discharging of the battery 2 is stopped before opening the battery 2.

FIG. 1 shows a relationship between the capacity retention rate and the internal pressure. The capacity retention rate is defined as a rate of remaining capacity of the battery 2 after being used to the capacity of unused battery 2. When the battery 2 is repeatedly charged or discharged, internal electrolyte or the like is dissolved so that the capacity retention time is gradually decreased. Accompanying this, gas it generated so that the internal pressure of the battery 2 increases. As described above, when the internal pressure reaches an opening valve pressure Po, the valve 23 is opened. According to the present embodiment, variation AP is considered to define the stop pressure Ps which is lower than the opening valve pressure Po. When the internal pressure reaches the stop pressure Ps, the charging/discharging of the battery 2 is stopped. Generally, the opening valve pressure Po is designed considering the material used for the battery 2, capacity, use environment and the usage thereof. The stop pressure Ps can be determined referring to the designed pressure of the opening valve pressure Po of a commercial battery. Also, the stop pressure PS can be determined by designing the opening pressure Po of the battery and the pressure resistance of the case, considering the relationship between the usage of the battery and property of an increase in the internal pressure.

As shown in FIG. 1, the internal pressure of the battery 2 is expressed by a linear function of the capacity retention rate. Hence, the primary function is obtained in advance, thereby calculating the capacity at which the internal pressure reaches the stop pressure Ps. The control unit 3 stores the capacity as the above-mentioned threshold. The control unit 3 determines that the internal pressure reaches the stop pressure Ps, when the measured capacity of the battery 2 is less than or equal to the threshold, and stops charging/discharging the battery 2.

Figure 4:
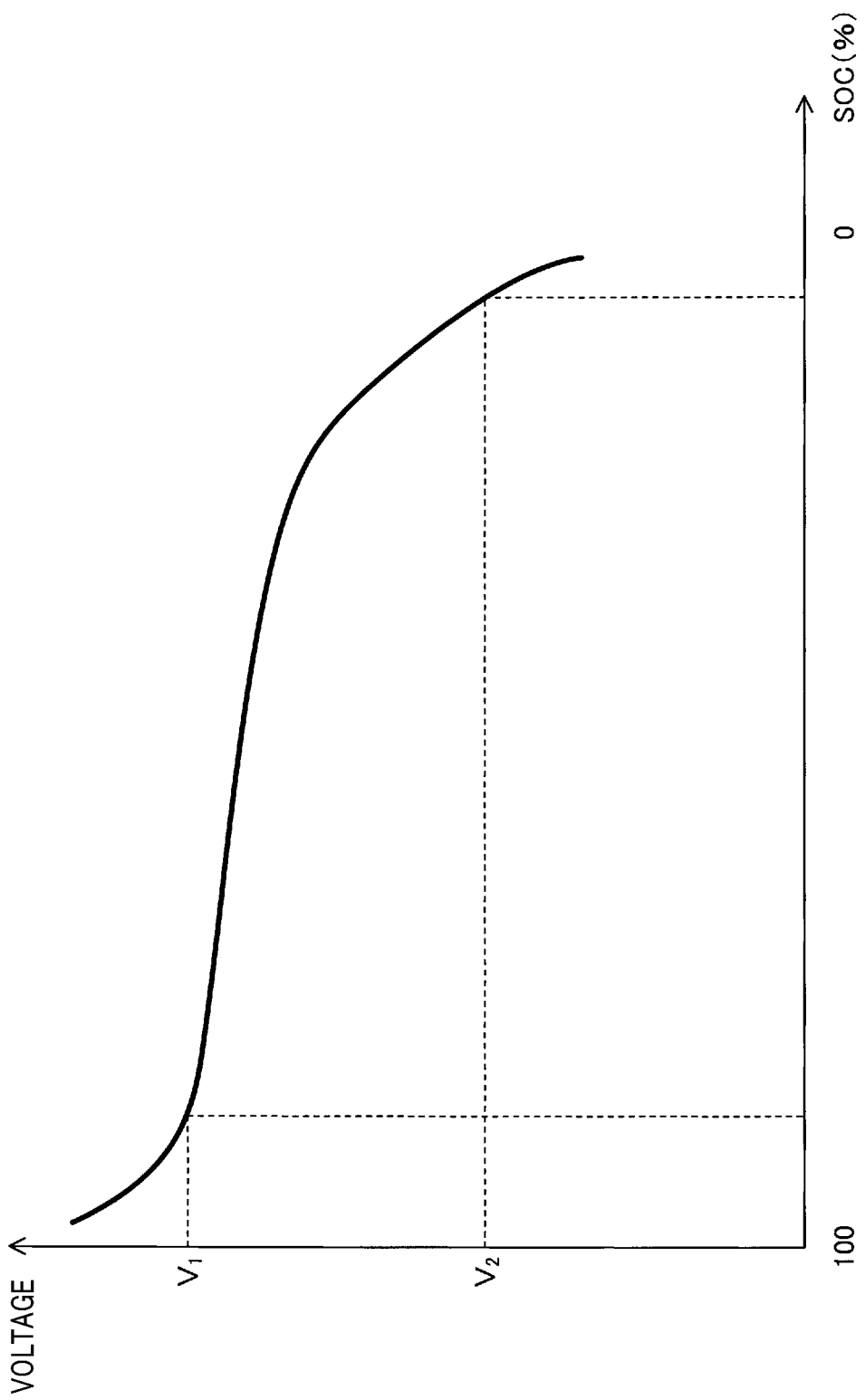
FIG. 4 is graph showing a measuring method of the battery capacity.

Next, the measuring method of the capacity of the battery 2 will be described. As shown in FIG. 4, when the battery 2 is discharged at a constant current, the voltage gradually decreases. The total battery capacity (Ah) can be calculated as follows. The time period is measured from a time when the voltage starts to decrease at V1 to a time when the voltage reaches V2, and measured period (h) is multiplied by the current value (A) to calculate the total capacity (Ah). Similarly, when the battery 2 is charged at a constant current, the capacity of the battery 2 can be calculated.

Figure 3:
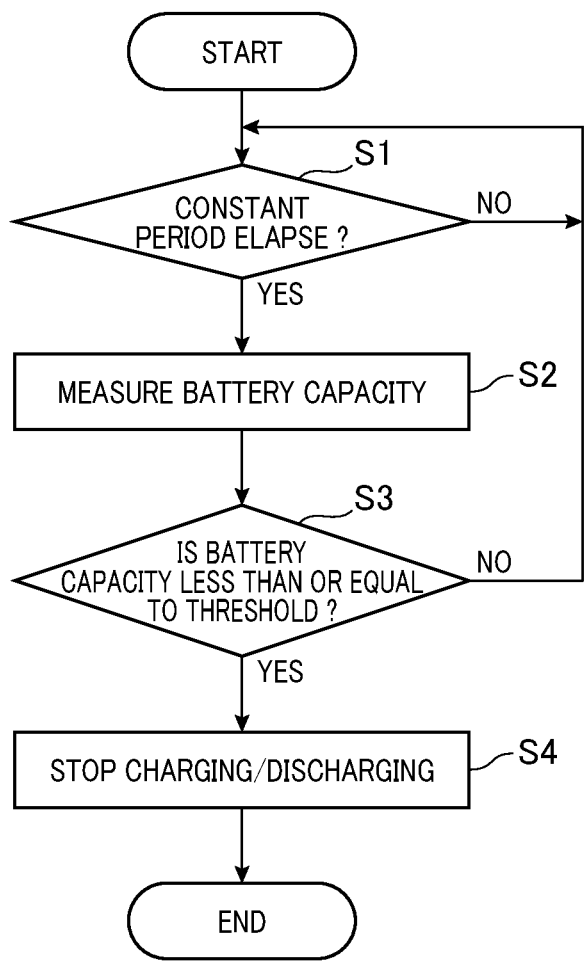
FIG. 3 is a flowchart of processes executed by a control unit according to the first embodiment.

Next, the flowchart of processes executed by control unit 3 will be described. As shown in FIG. 3, the control unit 3 executes a process at step S1, when the unused battery 2 is start to operate. In this step, the process determines whether a constant period has elapsed (e.g., several days). When the determination at S1 is Yes, i.e., the period has elapsed, the process proceeds to step S2. At step S2, the capacity of the battery 2 is measured. As described above, the capacity of the battery 2 can be calculated, for example, by using the period required charging or discharging the battery 2 at the constant current.

The process proceeds to step S3 after executing the process at step S2. At step S3, the process determines whether or not the capacity of the battery 2 is the threshold or less. When the determination at step S3 is No, i.e. the battery capacity is greater than the threshold, the process returns to step S1. When the determination at step S3 is Yes, i.e. the battery capacity is greater than the threshold, the process proceeds to step S4. At step S4, the process stops charging/discharging the battery 2 since the internal pressure of the battery 2 reaches the above-described stopping voltage Ps.

Next, effects and advantages of the present embodiment will be described. As shown in FIG. 1, a correlation is present between the capacity of the battery 2 which has been deteriorated due to repeated charge/discharge cycles, and the internal pressure of the battery 2. Specifically, the correlation is determined such that the lower the capacity of the battery, the higher the internal pressure of the battery 2 in response to an increase in an amount of the gas.

According to the present disclosure, the above-described characteristics of the battery 2 are used. Specifically, a capacity measuring unit 31 measures a capacity of the battery 2, and the stop commanding unit 32 stops charging/discharging when the measurement value is a predetermined threshold or less. Thus, since the capacity of the battery 2 has a strong correlation with the internal pressure, determination of stopping the charge/discharge operation can be performed accurately. In other words, since the internal pressure is likely to reach the stop pressure Ps when the capacity of the battery 2 reaches the above-mentioned threshold or less, it is determined that the battery 2 should stop the charging/discharging.

Also, when the configuration of the present disclosure is employed, charging/discharging can be determined to be stopped with only the latest measurement value of the capacity of the battery 2. Hence, it is not necessary to measure the temperature or the like for a long period of time which has been performed in a conventional configuration. Therefore, determination of stopping charging/discharging can be accomplished by the control unit 3 with a simple configuration.

According to the present disclosure, the stop determination of charge/discharge operation can be performed using only the latest capacity value of the battery 2, so that measurement data such as temperature data is not necessarily accumulated, unlike the conventional configuration. Accordingly, fault due to lost measurement data or the like does not occur in the configuration of the present disclosure.

As described above, according to the present embodiment, a battery control system can be provided with enhanced reliability of determination of stopping charging/discharging the battery.

According to the present embodiment, the battery 2 is connected to an on-vehicle inverter. However, the present disclosure is not limited to this configuration. Alternatively, the battery 2 may be used as a stationary type power source such as home energy management system (HEMS), or a power source for a computer and a smartphone.

Hereinafter, in the following embodiments, reference symbols in the drawings which are the same as the one used in the first embodiment represent the same elements as in the first embodiment, unless otherwise specified.

Second Embodiment

Figure 8:
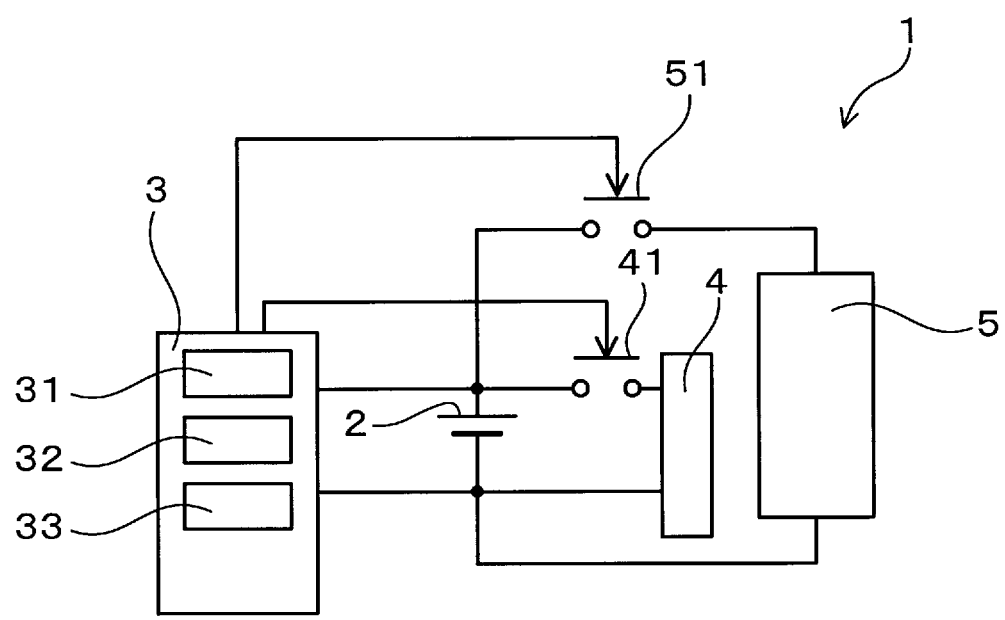
FIG. 8 is a diagram showing a concept of the battery control system according to the second embodiment.

The present embodiment is an example in which the control unit 2 is modified. As shown in FIG. 8, the control unit 3 of the present embodiment is provided with an input calculation unit 33 other than the above-described capacity measuring unit 31 and the stop commanding unit 32. The input calculation unit 33 calculates the above-described threshold by using information about the temperature and the state of charge (SOC) of the battery 2, the information being transmitted externally to the battery control system 1 (i.e., external information). Note that "information about the temperature and the state of charge" may include a region where the battery 2 is used, system information. These information is correlated to the temperature and the SOC. The input calculation unit 33 corresponds to first calculation unit.

The battery 2 is likely to generate gas since the electrolyte or the like easily reacts to be decomposed. Also, when the SOC of the battery 2 is kept high, since the voltage level continues to be high, electrolyte or the like easily to react to be decomposed so that the battery 2 is likely to generate gas.

Figure 6:
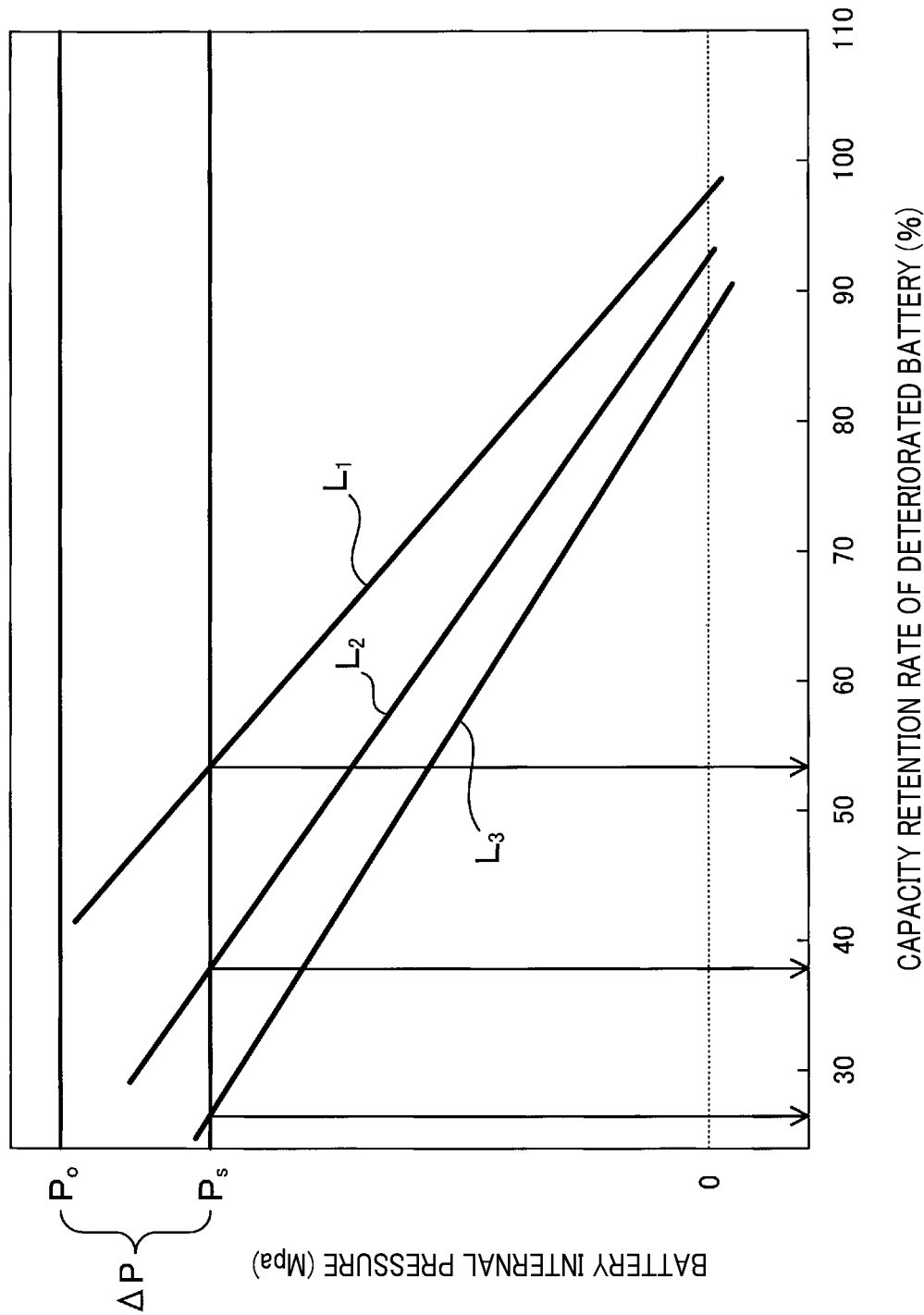
FIG. 6 is a graph showing a relationship between the battery capacity and an internal pressure of the battery according to a second embodiment.

FIG. 6 illustrates a relationship between the capacity retention rate and the internal pressure for a plurality of batteries 2 each having different operating environment. The line $L_1$ shows a relationship between the capacity retention rate and the internal pressure, when the battery 2 is used in a region where the ambient temperature is relatively high and used in a system that is likely to operate in high SOC. The line $L_3$ shows a relationship between the capacity retention rate and the internal pressure, when the battery 2 is used in a cold region where the ambient temperature is relatively low and used in a system that is likely to operate in low SOC. Further, the line $L_2$ shows a relationship between the capacity retention rate and the internal pressure, when the temperature and the SOC is in a middle between the line $L_1$ and $L_3$.

Referring to FIG. 6, even if deteriorated battery 2 has the same capacities, the internal pressures are different depending on the region where the battery 2 is used. This is because, when the temperature of the battery 2 is high and high SOC state continues, gas is likely to be generated in the battery so that the internal pressure is likely to increase. Hence, the capacity threshold at the stop pressure Ps varies depending on the operating environment. For example, for the line $L_1$, since the internal pressure of the battery reaches the stop pressure Ps faster than others, the capacity threshold has to be larger. Also, for the line $L_3$, since the internal pressure does not reach the stop pressure Ps soon, the capacity threshold can be set to be smaller. The input calculation unit 33 calculates the capacity threshold by using the external information about the temperature of the battery 2 and the SOC, and sets the capacity threshold in the system.

For example, the threshold can be calculated as follows. First, a relationship between the temperature and the SOC of the battery 2, and the slope and the intercept of the primary function are prepared in advance. Specifically, when receiving the region where the battery 2 is used and the type of the system as external information, the average temperature of the region and the average value of the SOC are calculated. The slope and the intercept of the primary function are determined by using these values. That is, the above-mentioned primary function is determined. Then, the battery capacity at the stop pressure Ps is calculated by using the primary function. This value is set in the system as the threshold.

As a calculation method of the threshold, the following method may be used as well. First, a relationship between the temperature/SOC of the battery and the threshold are acquired, and this relationship is stored as a map. Then, when the region and the system type are received from an external device, the system calculates the average temperature of the region and the average value of the SOC, and calculates the capacity threshold by using these values and the above-described map.

Figure 7:
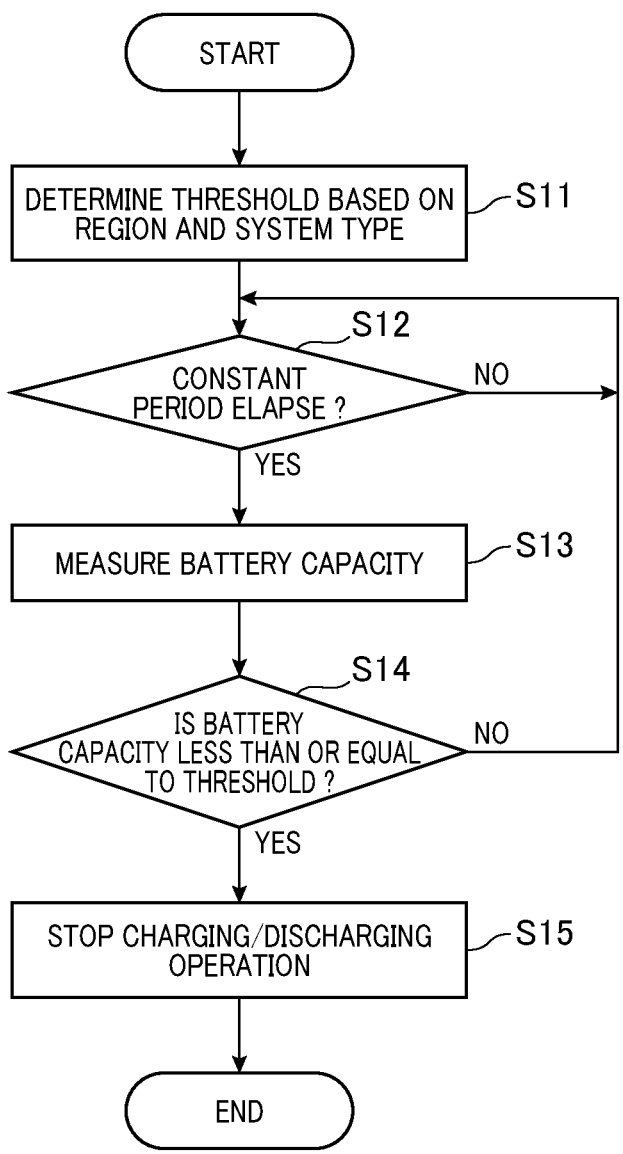
FIG. 7 is a flowchart of a process executed by the control unit according to the second embodiment.

Next, the flowchart of processes executed by the control unit 3 will be described. As shown in FIG. 7, when starting the operation of the battery 2, the control unit 3 executes step S11. In step S11, the process calculates the capacitor threshold based on the region where the battery 2 is used and the type of system (i.e., information about operating temperature and SOC) and sets the capacitor threshold in the system.

Then, the process proceeds to step S12. In step S12, it is determined whether a predetermined period has elapsed. When the determination is Yes, i.e. the period has elapsed, the process proceeds to step S13. In this step, the capacity of the battery 2 is measured. Then the process proceeds to step S14. At step S14, the process determines whether or not the capacity of the battery 2 is the threshold or less. When the determination is No, i.e. the period has not elapsed, the process returns to step S12. Also, when it is determined as Yes at step S14, the process proceeds to step S15. At step S15, since the internal pressure of the battery 2 reaches the stop pressure Ps, the charging/discharging operation of the battery 2 is stopped.

Next, effects and advantages of the present embodiment will be described. The control unit 3 of the present embodiment is provided with the above-described input calculation unit 33. Hence, suitable threshold can be set depending on the operating temperature and the SOC of the battery 2. As a result, the system can more accurately determine whether or not charging/discharging operation of the battery 2.

In addition, the present embodiment has the same configuration, effects and advantages as that of the first embodiment.

Third Embodiment

Figure 10:
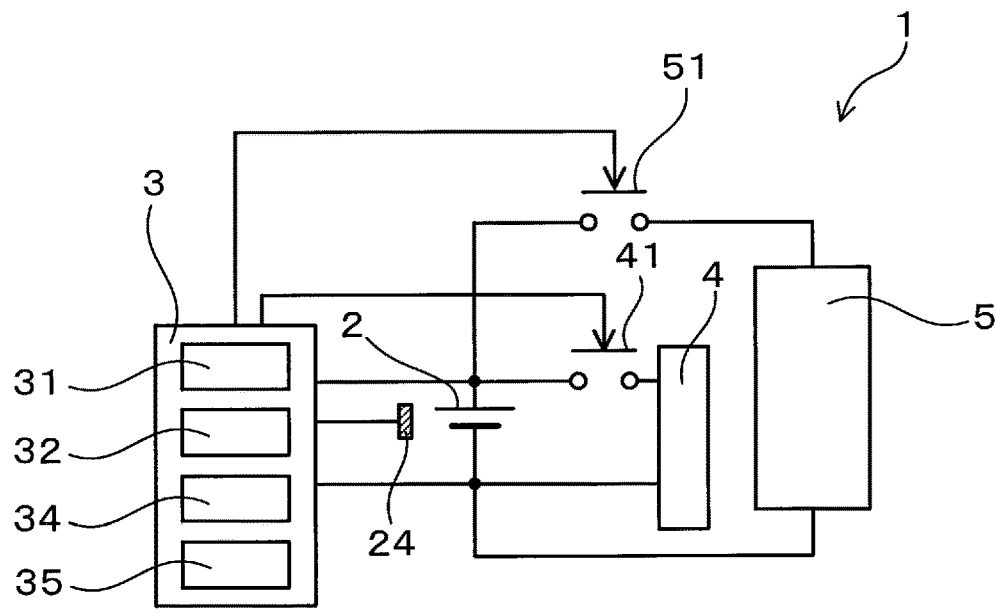
FIG. 10 is a diagram showing a battery control system according to the third embodiment.

The present embodiment is an example in which the configuration of the control unit 3 is modified. As shown in FIG. 10, the control unit 3 of the present embodiment is provided with a parameter measuring unit 34 and an automatic calculation unit 35. The parameter measuring unit 34 measures parameters such as the temperature and state of charge (SOC) of the battery 2 under the operating environment. The automatic calculation unit 35 calculates the above-described threshold. The automatic calculation unit 35 corresponds to second calculation unit.

Figure 9:
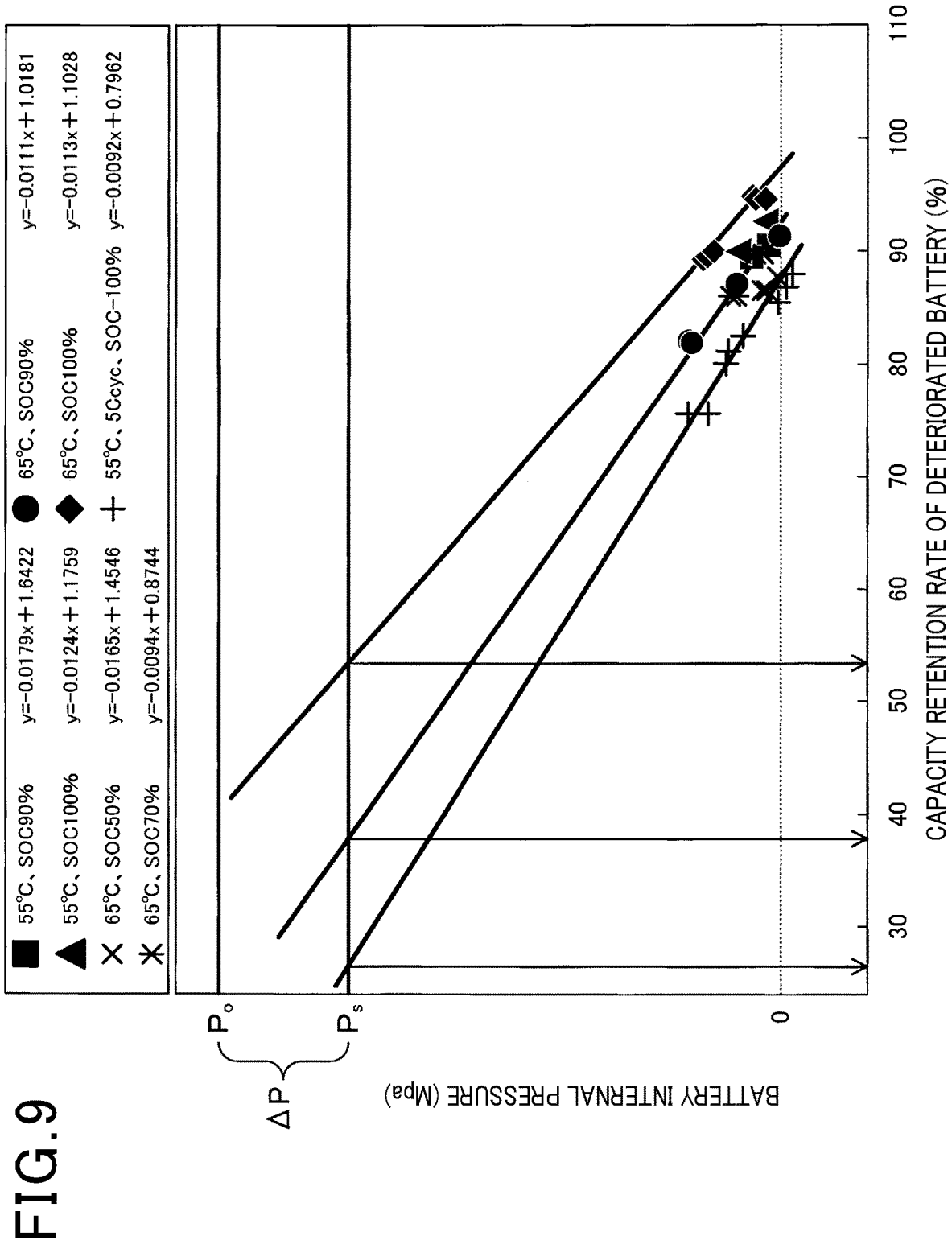
FIG. 9 is a graph showing a relationship between the battery capacity and the internal pressure.

As described, in the case where the temperature and the SOC are high, the amount of generated gas increases so that the internal pressure of the battery 2 is likely to increase. FIG. 9 illustrates a graph in which measurement values of the capacity retention rate and the internal pressure are plotted. Some of the measurement values are plotted to draw approximation line obtained by using the least squares method. As shown in FIG. 9, it is realized that even in the case of the same capacity retention rate, the larger the temperature and the SOC, the higher the internal pressure.

According to the present embodiment, the threshold is calculated without using external information about the operating temperature and the SOC of the battery 2 which is transmitted from an external device. However, the system uses information acquired by the control unit 3 to calculate the capacity at which the internal pressure reaches the stop pressure Ps, that is, the threshold.

The calculation of the threshold may adopt the following method, for example. First, a relationship between the temperature and SOC of the battery 2, and the slope and the intercept of the line of the primary function are prepared in advance. Then, the system regularly measures the operating temperature and the SOC of the battery 2 after the user started to use the battery 2. By using the measurement values, the slope and the intercept of the line is determined. That is, linear line is determined to obtain the capacity at which the internal pressure of the battery reaches the stop pressure Ps, i.e., threshold.

Figure 11:
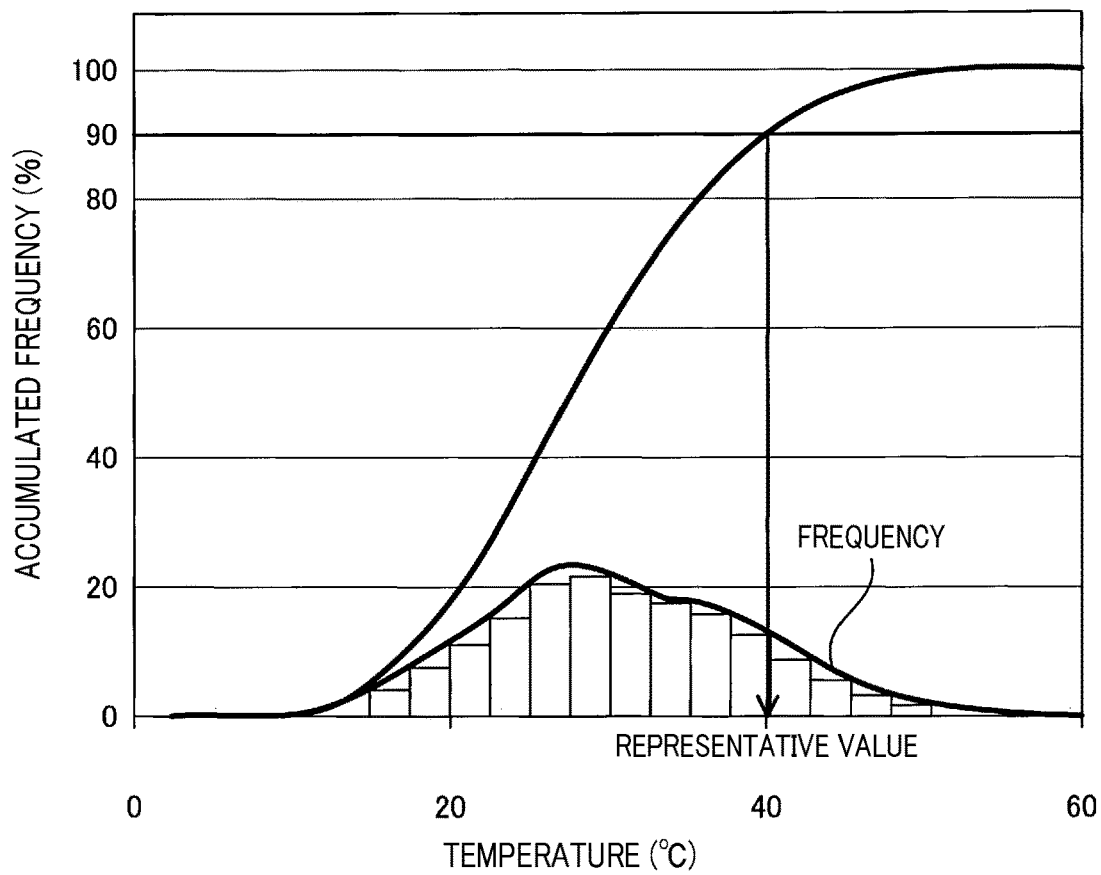
FIG. 11 is a graph showing a calculation method of a representative value of the temperature according to a third embodiment.

The calculation method of the threshold will be described in more detail. As shown in FIG. 10, according to the present embodiment, the temperature sensor 24 is attached to the battery 2. The temperature sensor 24 is used to regularly measure the temperature of the battery 2. The measurement may be performed once 30 minutes, for example. As shown in FIG. 11, the system acquires a distribution of the temperature and accumulated frequency, and determines the temperature at which the accumulated frequency is 90% (i.e., 90% occupancy value) to be a representative value.

Figure 12:
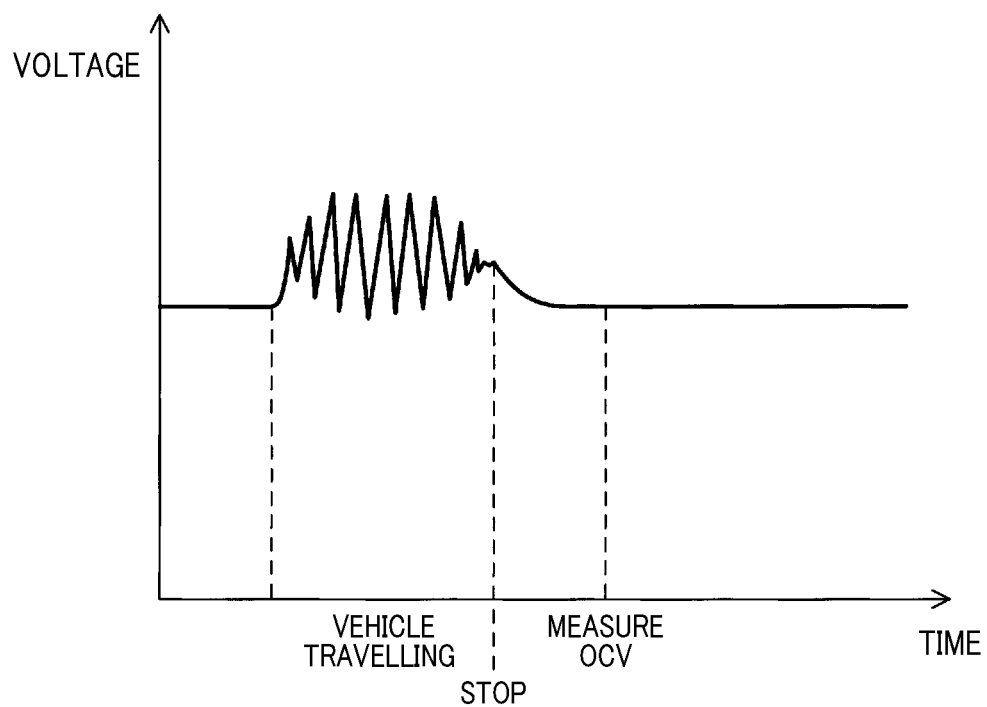
FIG. 12 is a timing diagram showing a measurement timing of the SOC according to the third embodiment.
Figure 13:
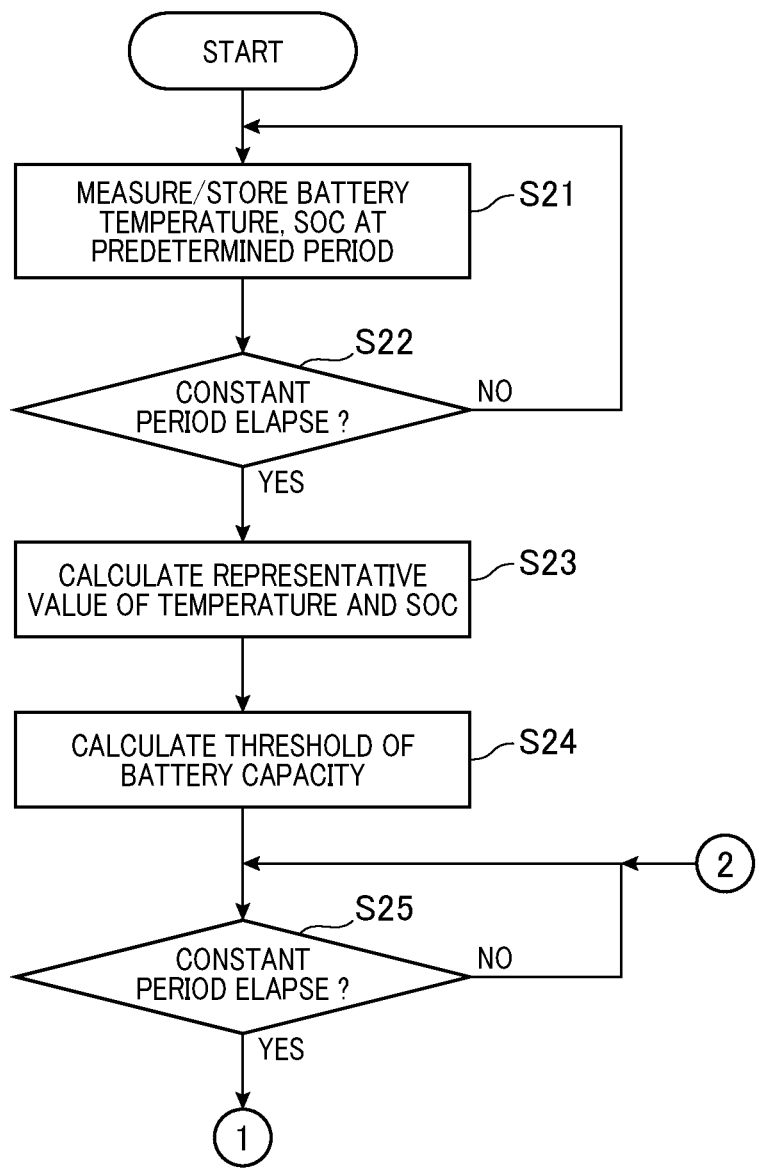
FIG. 13 is a flowchart showing a process executed by the control unit according to the third embodiment.
Figure 14:
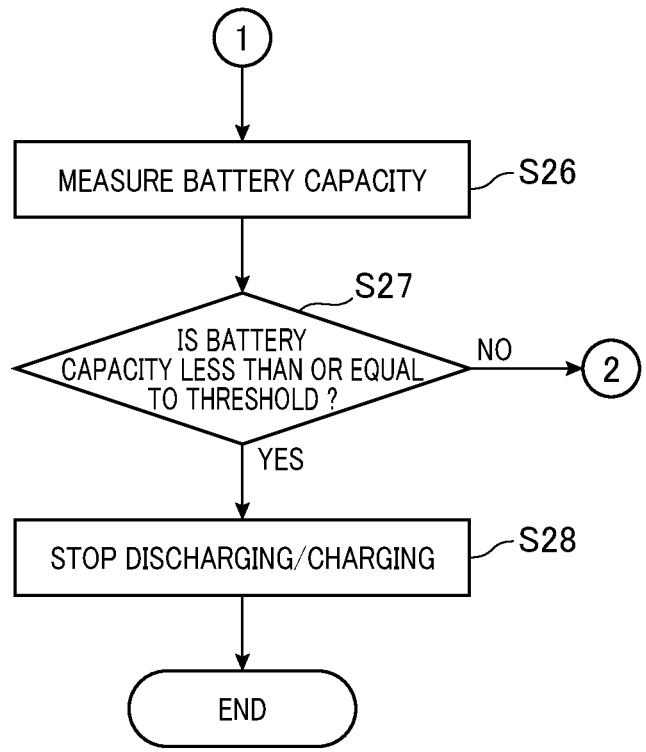
FIG. 14 is a flowchart continued from FIG. 13.

Further, the SOC of the battery 2 can be calculated by measuring the open circuit voltage (OCV) of the battery 2. Since the OCV of the battery 2 cannot be measured accurately immediately after the battery 2 is charged/discharged, the OCV is measured after some time elapses since the battery 2 is stopped to charge/discharge. For example, in the case where the battery 2 is used as an inverter of a vehicle, as shown in FIG. 12, the battery 2 is discharged, or charged from the inverter (regeneration), while the vehicle is running. Hence, the voltage of the battery 2 is unstable while the vehicle is running. However, when several hours have elapsed after the vehicle stops, the voltage at the battery 2 becomes stable and the OCV can be measured. For example, OCV is measured daily and the SOC can be obtained by using the measured OCV value. The OCV may be measured throughout the year, for example, and the 90% occupancy value is calculated as a representative value, similar to the representative value of the temperature (See FIG. 11). Then, a linear line shown in FIG. 9 is determined, by using the representative values of the temperature and the SOC, to calculate the threshold.

Next, a flowchart of processes executed by the control unit 3 according to the present embodiment will be described. When a brand-new battery 2 is used, the control unit 3 first executes the process in step S21. Here, the temperature and the SOC of the battery are measured at predetermined periods. For example, the temperature is measured every 30 minutes and the SOC is measured once a day, for example.

Thereafter, the process proceeds to step S22. In step S22, it is determined whether or not a specified time has elapsed. For example, the process determines whether or not the temperature and the SOC have been measured for a year or more. When the determination is No at step S22, i.e. the time has not elapsed, the process returns to step S21. When the determination is Yes, i.e. the time has elapsed, at step S22, the process proceeds to step S23.

In step S23, the representative values of the temperature and the SOC are calculated. Here, measurement values of the temperature and the SOC are used to calculate 90% occupancy value (see FIG. 11) as a representative value.

Then, the process proceeds to step S24. At step S24, a threshold of the battery capacity is calculated. Specifically, the representative values of the temperature and the SOC are used to determine the linear line shown in FIG. 9, thereby calculating the capacity at which the internal pressure of the battery 2 reaches the stop pressure Ps, that is the threshold.

Thereafter, the process proceeds to step S25. At this step S25, the process determines whether or not the battery 2 has been used for a predetermined period. When the determination is Yes, the process proceeds to step S26. In step S26, the process measures the capacity of the battery 2.

Next, the process proceeds to step S27. At step S27, the process determines whether or not the capacity of the battery 2 is the threshold or less. When the process determines No at step S27, returns to step S25. When the process determines Yes at step S27, proceeds to step S28. At step S28, the process stops charging/discharging the battery, since the internal pressure of the battery 2 reaches the stop pressure Ps.

Next, effects and advantages of the present disclosure will be described. The control unit 3 according to the present embodiment is provided with the above-described parameter measuring unit 34 and the automatic calculation unit 35. Hence, the parameter measuring unit 34 can measures a state of the battery 2, that is the parameters. Accordingly, the actual state of the battery 2 can be used to calculate the threshold. Accordingly, the threshold can be accurately calculated so that the process more accurately determines whether or not charging/discharging of the battery 2 should be stopped.

The above-described parameter measuring unit 34 regularly measures the temperature and the SOC of the battery 2 as the above-described parameter. The automatic calculation unit 35 determines the representative value from among the plurality of measurement values of the temperature and the SOC, and calculates the capacity threshold by using the determined representative value.

In this case, the threshold is accurately calculated. In other words, since the temperature and the SOC correlates with the threshold (See FIG. 9), these temperature and the SOC are measured, whereby the threshold can be accurately measured. Also, according to the present disclosure, the temperature and the SOC are measured multiple times, and the representative value is determined from among the plurality of measurement values, thereby obtaining the threshold. Therefore, the reliability of the threshold is high.

It should be noted that the representative value of the temperature and the SOC may preferably be a value which occupies at least 90% of the measurement values. According to this configuration, the representative value of the temperature and the SOC can be higher. Accordingly, the calculated threshold is higher so that charging/discharging operation of the battery 2 can be stopped faster. As a result, the internal pressure of the battery 2 is unlikely to reach the stop pressure Ps so that possibility of opening the valve 23 becomes low.

According to the present disclosure, the temperature and the SOC are regularly measured at least throughout the year, and the measurement values are used to calculates the above-described representative value. Therefore, sufficient measurement values can be collected so as to improve the reliability of the representative value. Hence, the reliability of the calculated threshold can be enhanced.

According to the present embodiment, the parameter measuring unit 34 is used to measure the temperature and the SOC of the battery 2. However, no significant problem arises even if this measurement data is lost due to some reason. This is because, even in this case, the above-described linear line (see FIG. 9) can be determined by measuring the temperature and the SOC again, thereby calculating the threshold. Further, the present embodiment has the same configuration, effects and advantages as that of the first embodiment.

According to the present embodiment, as a representative value of the temperature and the SOC, a value which occupies at least 90% of the measurement value (i.e., 90% occupancy value) is used. However, the present invention is not limited to this value. Alternatively, for example, 50% occupancy value, 80% occupancy value, or 100% occupancy value may be used. Moreover, a capacity threshold may be calculated by using a relationship between the internal pressure of the battery and the capacity retention rate with the parameters including the temperature and the SOC, or a map, and frequency of ambient temperature and the SOC which are measured or predicted, thereby obtaining the representative value.

Figure 15:
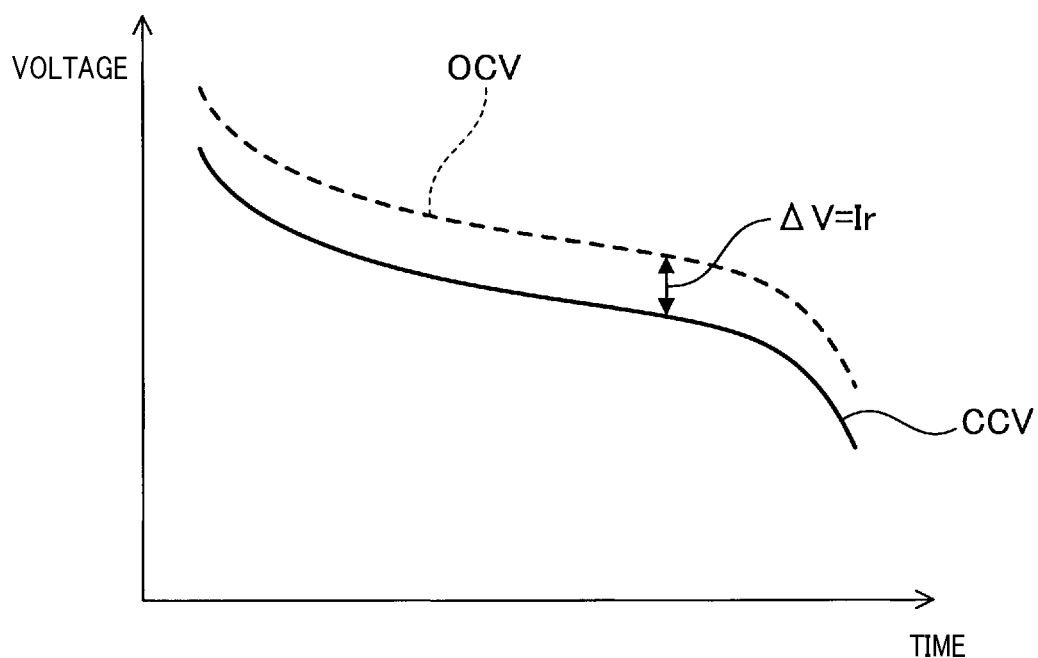
FIG. 15 is graph used for explaining a calculation method of the SOC by using a voltage at the battery during discharging.

According to the present embodiment, as shown in FIG. 12, the OCV is measured at a time after predetermined time elapses since charging/discharging operation is stopped for the battery 2, and the measurement value is used to calculate the SOC. However, the present disclosure is not limited to this. For example, as shown in FIG. 15, while the battery 2 is discharging, the voltage (i.e., closed circuit voltage: CCV) is measured. The following relationship is present between the is measured CCV, the discharging current I, the internal resistance r of the battery 2 and the OCV.

$$OCV=CCV+I\cdot r$$

In accordance with this equation, OCV is calculated and further the SOC can be calculated by using the calculated OCV. According to these calculation, the SOC can be calculated while the battery 2 is operating. Hence, the number of measurements of the SOC can be increased so that the representative value of the SOC can be more reliable (increase the reliability).

What is claimed is:

1. A battery control system comprising:
 a secondary battery that internally produces gas when used, a capacity of the secondary battery deteriorating with use, an internal pressure of the secondary battery being increased with the gas produced in the secondary battery; and
 a control unit that controls charging/discharging of the secondary battery, the control unit including:
  a capacity measuring unit that measures the capacity of the secondary battery; and
  a first calculation unit that calculates a threshold using information related to temperature and a state of charge of the secondary battery over time, the information including a region where the battery control system is used and information of a system on which the battery control system is installed, the information being received from outside the battery control system; and a stop commanding unit that stops charging/discharging of the secondary battery when the capacity measured by the capacity measuring unit is less than or equal to the threshold, wherein the threshold is determined in advance using a correlation between the internal pressure and the capacity of the secondary battery, and corresponds to a stop pressure lower than a valve release pressure of the secondary battery.

2. The battery control system according to claim 1, wherein the control unit includes:

a parameter measuring unit that measures the temperature and the state of charge of the secondary battery in an operating environment over time; and a second calculation unit that calculates the threshold using the temperature and the state of charge of the secondary battery measured by the parameter measuring unit.

3. The battery control system according to claim 2, wherein the parameter measuring unit regularly measures the temperature and state of charge of the secondary battery over time to generate a plurality of measurement values of the temperature and the state of charge; and the second calculation unit determines a representative value from among the plurality of measurement values, and calculates the threshold by using the determined representative value.

4. The battery control system according to claim 3, wherein the parameter measuring unit is configured to regularly measure the temperature and the state of charge for at least a year.

* * * * *